March 18, 1941. S. F. BAKER 2,235,351
SEALING DEVICE
Filed July 29, 1938 3 Sheets-Sheet 1

Inventor
Solomon F. Baker.
By Cameron, Kerkam + Sutton
Attorneys

March 18, 1941.  S. F. BAKER  2,235,351
SEALING DEVICE
Filed July 29, 1938  3 Sheets-Sheet 2

Inventor
Solomon F. Baker.
By Cameron, Kerkam + Sutton
Attorneys

March 18, 1941.  S. F. BAKER  2,235,351
SEALING DEVICE
Filed July 29, 1938  3 Sheets-Sheet 3
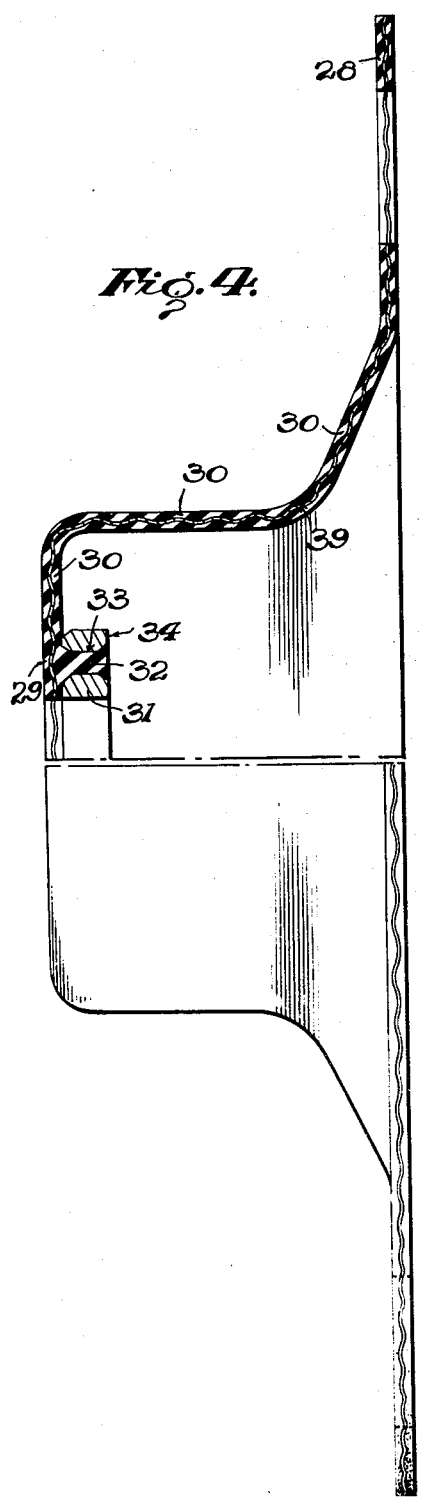
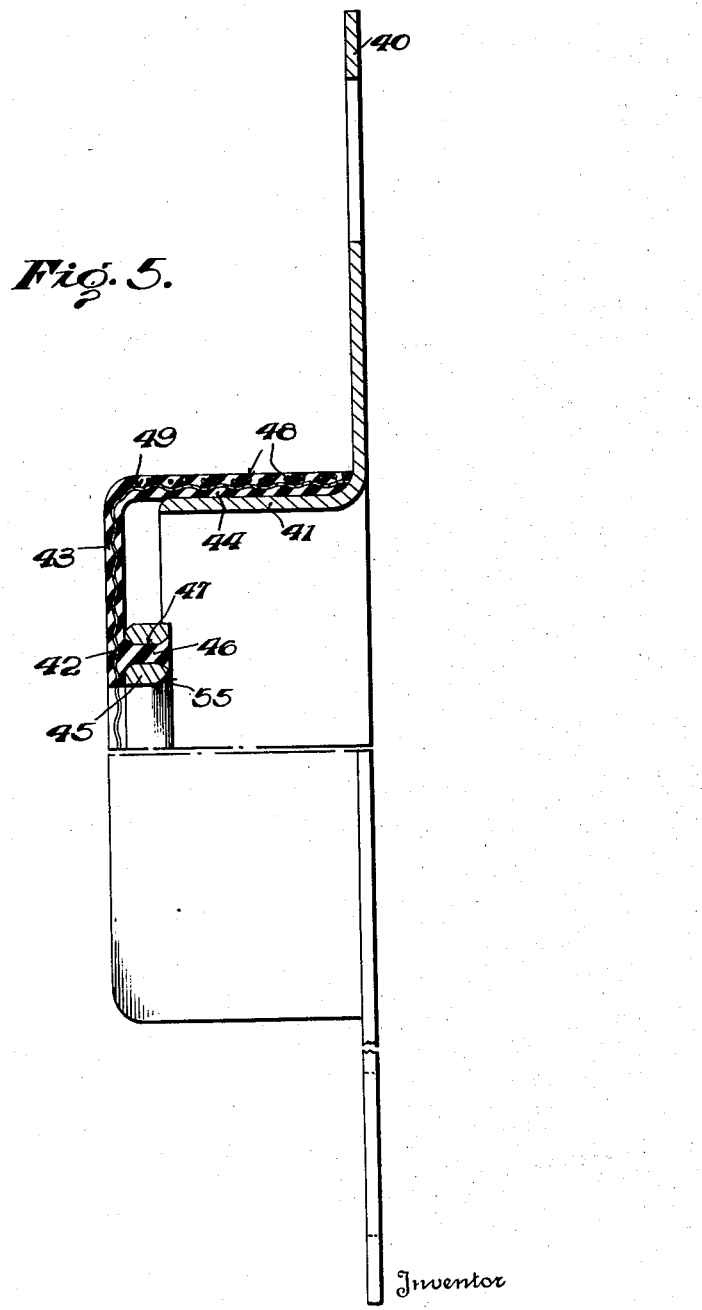
Inventor
Solomon F. Baker.
By Cameron, Kerkam + Sutton
Attorneys Patented Mar. 18, 1941

2,235,351

UNITED STATES PATENT OFFICE 2,235,351

SEALING DEVICE

Solomon F. Baker, Detroit, Mich., assignor to Thornton Tandem Company, Detroit, Mich., a corporation of Michigan Application July 29, 1938, Serial No. 222,070

7 Claims. (Cl. 288—2)

This invention relates to sealing devices for rotatable shafts, and more particularly to means for preventing the escape of lubricant from axle housings.

While the seal of the present invention possesses utility in a wide field of specifically different applications, it is especially well adapted for embodiment in motor vehicle driving axles of the type shown in the patents to Ray Thornton, No. 2,047,088, dated July 7, 1936, and Norman Van Husen, No. 2,116,485, dated May 3, 1938, wherein torque resisting means are connected to the differential encasing portions of the axle housings and extend outwardly therefrom around the axle driving shafts.

Prior to the development of the seals disclosed and claimed herein, considerable difficulty had been experienced in preventing the leakage of oil from axle housings outwardly along the axle driving pinion shafts, especially after the axles had been in service a sufficient length of time for wear of the sealing surfaces to take place. This was particularly true of those seals wherein dependence was placed upon the inherent resiliency of the material of the sealing member to take up the wear. Even in the case of recently developed sealing members of the same general type as those of the present invention, it has been difficult to attain effective oil sealing over periods of service corresponding to vehicle operations on the order of 75,000 to 100,000 miles.

It is therefore one of the objects of the present invention to provide an improved form of sealing device for a rotatable shaft which will more readily compensate for wear of the sealing surfaces and will maintain its sealing efficiency over longer periods of service than other devices of the same general character heretofore known to the art.

Another object is to provide a seal of the character described which is relatively simple and rugged in structure, inexpensive to manufacture, and quickly and easily installed.

A further object is to provide an oil sealing member of novel construction for cooperation with the driving shaft of an automotive axle comprising both a metallic wearing section and a flexible composition body section, which member may be assembled by a simple molding operation and thereafter handled as an integral unit.

Still another object is to provide a sealing device of the type wherein the seal is made along a surface perpendicular to the axis of the rotating member which embodies means for preventing distortion of the flexible portion thereof due to rotational friction.

These and other objects will appear more fully upon a consideration of the detailed description of the various embodiments of the invention which follows. Although two specific forms of seal are described and illustrated in the accompanying drawings, it is to be expressly understood that these drawings are for the purpose of illustration only and are not to be construed as defining the limits of the invention, reference being had for this latter purpose to the appended claims.

Referring now to the drawings, wherein like reference numerals indicate like parts throughout the several views:

Figs. 4 and 5 are enlarged side views, part in elevation and part in section, of the sealing members of Figs. 2 and 3, respectively.

Figure 1:
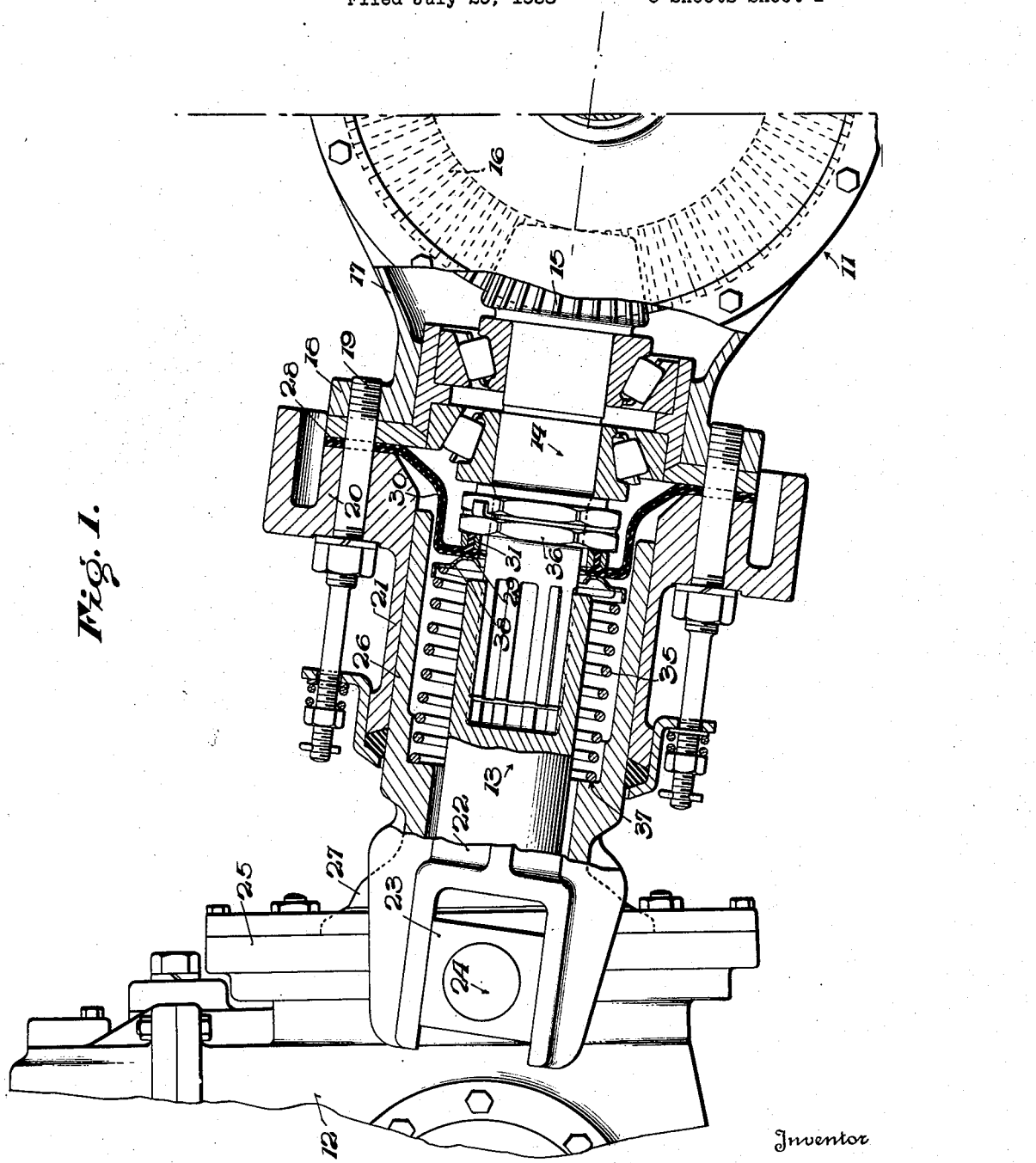
Fig. 1 is a vertical cross sectional view, with certain parts shown in full, of a portion of a driving axle assembly for an automotive vehicle illutrating one embodiment of the present invention.

In Fig. 1 there is shown a portion of a tandem driving axle assembly for an automotive vehicle similar in its general construction to that disclosed in the aforementioned Van Husen Patent No. 2,116,485, in which is embodied one form of sealing device constructed in acordance with the present invention. As illustrated, each of the tandem axles of the assembly (only one of which is shown in the drawing, indicated generally at 11) is adapted to be driven through a suitable auxiliary transmission housed in a frame-supported casing 12, the element 13 being the socketed, internally splined end of a universal joint member having a sliding driving engagement with the externally splined end of the axle driving pinion shaft 14, the latter being provided with the usual pinion 15 meshing with the ring gear 16 of the axle differential. The differential housing 17 of the axle 11 is provided with a flange 18 to which is secured by bolts 19 the base or flange portion 20 of a torque resisting member, the latter also comprising a centrally located tubular extension 21 coaxial with and surrounding the axle driving pinion shaft 14 and a pair of parallel, yoke-forming arms 22 which extend toward and on opposite sides of transmission casing 12. Arms 22 are provided with slotted ends slidably encompassing blocks 23 which are journalled on the trunnions 24 of a gimbal ring 25 rotatably supported on the casing 12. Slidably received within the tubular extension 21 is the tubular end 26 of another member of the torque resisting arrangement the opposite end of which is substantially bell-shaped as indicated at 27 and is so connected to the transmission casing 12 as to be capable of universal movement about a center lying at the intersection of the axis of trunnions 24 and the axis of pinion shaft 14. The slidable relationship between universal joint member 13 and pinion shaft 14, and between extension 21 and tubular end 26, insures free movement of the axle 11 toward and away from the casing 12 upon deflection of the springs (not shown) which connect the axles to the frame.

In order to prevent the escape of lubricant from the housing of axle 11 along pinion shaft 14 into the interior of the torque resisting means an improved form of sealing device has been provided which will maintain its sealing efficiency and automatically compensate for wear of the sealing surfaces over longer periods of service than similar devices heretofore known. In the embodiment illustrated in Figs. 1, 2 and 4, the sealing device comprises an annular dish-shaped body portion molded in one piece out of a suitable flexible, oil-impervious material, such as an artificial rubber composition of which there are several different makes on the market, and a sealing or packing ring of metal, preferably of bronze, carried by the inner peripheral section of the body portion.

As shown, the body portion of the sealing member consists of a flat outer flange section 28, an inner ring-carrying section 29 lying in a plane parallel to but spaced from that of the flange section 28, and an angularly formed intermediate section 30 connecting the flange and ring-carrying sections. The metallic sealing or packing ring 31 is secured to the front or right hand-side (as viewed in the drawings) of the inner ring-carrying section 29 of the body portion of the sealing member by means of a plurality of circumferentially spaced lugs 32 which are molded integrally with the ring-carrying section 29 and extend perpendicularly thereto into holes or openings 33 formed in ring 31. As will be seen from the drawings, the holes 33 are countersunk at both ends so as to provide enlarged end portions for the lugs 32, and thereby more effectively secure the ring 31 to the body portion of the sealing member. The outer edge of ring 31 next to ring-carrying section 29 is also preferably chamfered as shown to avoid a sharp corner at this point.

In manufacturing a sealing device of this character, it will be understood that the ring 31 is first properly placed in the mold in which the body portion of the sealing member is to be formed, after which the mold is poured with the material of the body portion in fluid state. In such a molding operation, it will be obvious that the molded material will flow into and entirely fill the countersunk holes 33 formed in the ring 31, and upon setting firmly secure the ring to the inner ring-carrying section 29. After the molding operation, the excess of molded material is trimmed off so as to provide a smooth metallic sealing surface 34 substantially parallel to the plane of outer flange section 28.

When installed in an axle assembly of the type shown in Fig. 1, the outer flange section 28 of the body portion of the sealing member is adapted to be fixedly clamped between the flange 18 of the axle differential housing 17 and the base or flange portion 20 of the torque resisting member 20, 21, 22, a plurality of openings being formed in the flange section 28 to receive the bolts 19. Since the body portion of the sealing member is perferably molded of a material that is slightly compressible as well as normally flexible, flange section 28 also serves as a gasket between the flanges of the axle differential housing and the torque resisting member.

The sealing surface 34 of the ring 31 is continuously urged by means of a compression spring 35 into sealing contact with the back of the outer locking nut 36 which is threaded to the pinion shaft 14. As shown, the spring 35 is housed within the tubular end 26 of the torque resisting member 26, 27 surrounding the pinion shaft 14, and is compressed between the back or left-hand side of ring-carrying section 29 of the sealing member and a shoulder 37 formed internally of the torque resisting member 26, 27. If necessary to provide sufficient clearance between the spring 35 and the outside of the socketed end 13 of the universal joint, a shouldered thrust ring 38 may be secured in any suitable manner, as by soldering, to the force applying end of the spring and may contact at its off-set portion of reduced diameter against the back of the ring-carrying section 29.

In order to strengthen the body portion of the sealing member, and particularly intermediate section 30 thereof, so as to resist rotational distortion due to the frictional contact between sealing surface 34 of ring 31 and the back of outer locking nut 36, a web or layer of woven stiffening material 39, such as fabric, is preferably embedded in said body portion during the molding operation. It will be understood, of course, that, while the material 39 is of such a character as to reinforce the body portion against rotational distortion in the plane of said material, it is not so stiff as to deprive the intermediate section 30 of sufficient flexibility to permit the spring 35 to continually maintain a sealing contact between the surface 34 of the ring 31 and the back of outer locking nut 36 and to automatically compensate for wear of said surfaces.

Figure 2:
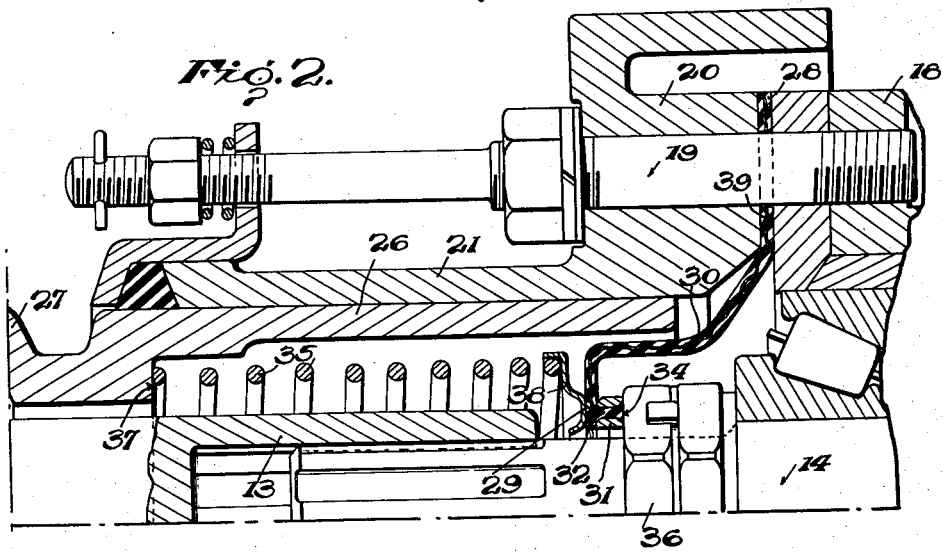
Fig. 2 is a half sectional view of the construction shown in Fig. 1 but on a larger scale and omitting some of the transmission and axle structure.
Figure 3:
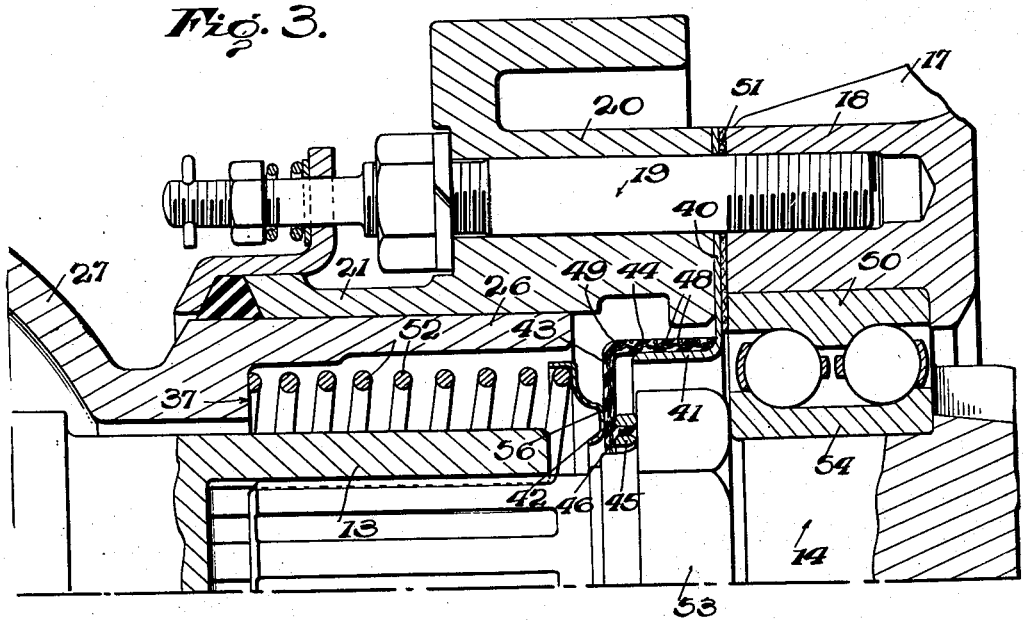
Fig. 3 is a half section similar to Fig. 2 illustrating a second embodiment of the invention.

In Figs. 3 and 5 there is shown a second form of sealing device embodying the present invention applied to a specifically different type of axle than that shown in Figs. 1, 2 and 4. In this second embodiment, the sealing member comprises an outer annular metallic portion having a flange section 40 and a central boss or collar 41 extending perpendicular to the flange section, an annular cup-shaped body portion molded in one piece of a suitable flexible, oil-impervious material, such as the artificial rubber composition previously mentioned, having an inner ring-carrying section 42 substantially parallel to the plane of flange section 40, an intermediate section 43, and a cylindrical outer peripheral section 44 which is suitably secured to the boss or collar 41 of the metallic portion, and a metallic sealing or packing ring 45 secured to the ring-carrying section 42 by means of lugs 46 molded integrally with the latter and holes 47 formed in the former in the same manner as that previously described in connection with Figs. 1, 2 and 4.

In the particular form shown in Figs. 3 and 5, the body portion of the sealing member is secured to the outer metallic portion by a pressed fit of the outer peripheral section 44 of the body portion over the boss or collar 41 of the metallic portion. In order to resist stretching of the outer peripheral section 44 and to cause the same to tightly grip the boss or collar 41, there is preferably embedded in the former a choker band 48 consisting of one or more layers of woven material, such as fine wire mesh. The choker band 48 is in addition to the layer of fabric reinforcing material 49 which extends throughout the molded body portion so as to strengthen it against rotational distortion. The choker band is also of limited width, extending only as far as the collar encompassing portion of outer peripheral section 44, the latter in turn having a width exceeding that of the boss or collar 41 so as to facilitate adjustment of the position of the inner peripheral ring-carrying section 42 to compensate for wear of the sealing surface of the sealing ring 45. In this connection, it will be noted that the portion of outer peripheral section 44 which extends beyond collar 41 is functionally part of the flexible intermediate section 43 in so far as adjustment of the sealing surface of ring 45 is concerned.

In this second embodiment of the invention, the flange section 40 of the outer metallic element of the sealing device is adapted to be fixedly clamped between the flange 18 of the axle differential housing 17 and the base or flange portion 20 of the torque resisting member 20, 21 as in the case of the embodiment of Figs. 1, 2 and 4, and also serves to maintain in proper position the outer race 50 of the bearing in which the pinion shaft 14 is journalled. The flange section 40 being of metal, it is also preferable to insert a gasket 51 of any suitable packing material between said flange section and the flange 18 of the axle differential housing.

In this embodiment, the sealing surface of the ring 45 is yieldably urged by a spring 52 into sealing contact with the back surface of a locking nut 53 which is threaded on the axle pinion shaft 14 and which also holds the inner race 54 of the pinion shaft bearing in its proper position. Where the back surface of nut 53 is curved as shown in the drawings, the inner edge of sealing ring 45 may be similarly shaped, as indicated at 55 in Fig. 5, so as to provide optimum conditions of sealing contact throughout the life of the seal. When the seal is initially installed, contact occurs between the flat portions only of the sealing surface of ring 45 and the back of nut 53, as shown in Fig. 5; however, as wear of the ring takes place the curved portion 55 of the sealing surface thereof gradually comes into contact with the curved portion of the nut 53, thereby increasing the effective sealing area and actually improving the efficiency of the seal as the length of service increases. As in the case of Figs. 1, 2 and 4, the spring 52 exerts its thrust in an axial direction, said thrust being communicated to the back of ring-carrying section 42 of the body portion of the sealing member through the medium of a shouldered thrust ring 56 similar to that previously described.

There is thus provided by the present invention an improved sealing device for rotatable shafts which, due to its simple, integrally molded construction, ease of installation and high efficiency over long periods of service, constitutes a substantial improvement over similar devices heretofore known. The present seal is so constructed that it readily flexes to permit automatic compensation for wear of the sealing surfaces but at the same time effectively resists rotational distortion due to the frictional contact between the sealing surface thereof and the cooperating surface of the rotating shaft. These and other characteristics of the sealing members of the present invention render the same particularly well adapted for embodiment in the driving axles of automotive vehicles, especially such axles as have torque resisting members secured to the differential housings thereof.

While two different forms of the invention have been described and illustrated in the accompanying drawings, it will be obvious that the invention is not limited to the exact structures shown but is capable of a variety of mechanical embodiments. For example, when used in combination with differently arranged rotatable elements or in devices other than the driving axles of automotive vehicles, the specific shape and location of the seal and the pressure spring assembly may be varied as described to conform to the actual conditions of use. Likewise, the various portions of the sealing member may be formed of specifically different materials than those herein described so long as they are capable of performing the required functions. Various other changes, which will now suggest themselves to those skilled in the art, may be made in the form, details of construction and arrangement of the parts without departing from the spirit of the invention. Reference is therefore to be had to the appended claims for a definition of the limits of the invention.

What is claimed is:

1. An annular sealing member of the character described comprising an outer flange section, a flexible intermediate section of non-metallic molded material, and an inner metallic sealing ring having a plurality of circumferentially spaced openings formed therein into which extend supporting elements molded integrally with said intermediate section.

2. An annular sealing member of the character described comprising an outer flange section, a flexible intermediate section and an inner ring-carrying section of non-metallic molded material, said ring-carrying section lying in a plane substantially parallel to the plane of said outer flange section, a metallic sealing ring, and means for fixing said sealing ring to said ring-carrying section consisting of a plurality of supporting elements molded integrally with said ring-carrying section and extending perpendicularly thereto into corresponding openings formed in said ring.

3. An annular sealing member of the character described comprising an outer flange section, a flexible intermediate section of non-metallic molded material, an inner metallic sealing ring, means for fixing said sealing ring to said intermediate section consisting of a plurality of supporting elements molded integrally with said intermediate section and extending into corresponding openings formed in said ring, and a layer of woven material embedded in said flexible intermediate section for resisting rotational distortion thereof.

4. In a sealing member of the character described, an annular body portion of non-metallic molded material having a section of substantially cylindrical shape and an inner peripheral section lying substantially at right angles to the axis of said cylindrical section and formed integrally therewith, and a metallic sealing ring carried by said inner peripheral section with the sealing surface of said ring also substantially perpendicular to the axis of said cylindrical section, said inner peripheral section having a plurality of elements molded integrally therewith and extending through openings formed in said sealing ring whereby said body portion and ring are secured together to form a unitary structure.

5. A sealing member of the character described comprising an annular outer metallic portion having a flange section and a collar perpendicular to the plane of said flange section, an annular body portion of non-metallic, flexible, molded material having its outer periphery so constructed and arranged as to surround and tightly grip said collar, and a metallic sealing ring carried by said body portion at its inner periphery.

6. A sealing member of the character described comprising an annular outer metallic portion having a flange section and a collar perpendicular to the plane of said flange section, an annular body portion of non-metallic, flexible, molded material having its outer periphery so constructed and arranged as to surround and tightly grip said collar, a metallic sealing ring carried by said body portion at its inner periphery, and a layer of woven material embedded in the collar-encompassing outer periphery of said body portion tending to resist stretching of the latter.

7. A sealing member of the character described comprising an annular outer metallic portion having a flange section and a collar perpendicular to the plane of said flange section, an annular body portion of non-metallic, flexible, molded material having an inner peripheral section substantially parallel to the plane of said flange section and a substantially cylindrical outer peripheral section surrounding and tightly gripping said collar, and a metallic sealing ring carried by said inner peripheral section of said body portion, the width of said cylindrical section exceeding that of said collar so as to facilitate adjustment of the position of said inner peripheral section to compensate for wear of the sealing surface of said sealing ring.

SOLOMON F. BAKER.